(12) United States Patent
Van Horn et al.

(10) Patent No.: US 10,185,945 B2
(45) Date of Patent: Jan. 22, 2019

(54) MULTIFUNCTION POINT OF SALE SYSTEM

(71) Applicant: Hand Held Products, Inc., Fort Mill, SC (US)

(72) Inventors: Erik Van Horn, Ocean View, NJ (US); Sean Philip Kearney, Marlton, NJ (US); Patrick Anthony Giordano, Glassboro, NJ (US); Timothy Good, Indian Land, SC (US); Chandler Dickinson, Skaneateles, NY (US); Ka Man Au, Philadelphia, PA (US); David Wilz, Sr., Sewell, NJ (US); John A. Furlong, Woodbury, NJ (US); Benjamin Hejl, Cherry Hill, NJ (US); Joseph A. Walczyk, Syracuse, NY (US); Larry Coyle, Weedsport, NY (US); James Rosetti, Auburn, NY (US); Thomas Haggerty, Collingswood, NJ (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 15/612,332

(22) Filed: Jun. 2, 2017

(65) Prior Publication Data

US 2017/0270504 A1 Sep. 21, 2017

Related U.S. Application Data

(63) Continuation of application No. 15/228,273, filed on Aug. 4, 2016, now Pat. No. 9,672,507, which is a
(Continued)

(51) Int. Cl.
*G06Q 20/20* (2012.01)
*G06Q 20/32* (2012.01)
(Continued)

(52) U.S. Cl.
CPC ....... *G06Q 20/208* (2013.01); *G06K 7/10722* (2013.01); *G06K 7/10732* (2013.01);
(Continued)

(58) Field of Classification Search
None
See application file for complete search history.

(56) References Cited

U.S. PATENT DOCUMENTS 6,832,725 B2 12/2004 Gardiner et al.
7,128,266 B2 10/2006 Marlton et al.
(Continued)

FOREIGN PATENT DOCUMENTS

WO 2013163789 A1 11/2013
WO 2013173985 A1 11/2013
(Continued)

OTHER PUBLICATIONS

U.S. Appl. No. 14/715,916 for Evaluating Image Values filed May 19, 2015 (Ackley); 60 pages.
(Continued)

*Primary Examiner* — Kristy A Haupt
(74) *Attorney, Agent, or Firm* — Additon, Higgins & Pendleton, P.A.

(57) ABSTRACT

A point of sale system capable of operating in an indicia-reading mode or a verification mode is disclosed. In the indicia-reading mode, the point of sale system configures its illumination, imaging, and processing to read indicia as part of a normal checkout process. If triggered by a user or by an event, the point of sale system may operate in a verification mode. In the verification mode, the point of sale system enables the necessary illumination, imaging, and processing to verify an item. This verification includes illuminating the item in a way that causes a noticeable response from a security mark (or marks) on the item. An image of the
(Continued)

response may be captured and processed to authenticate/verify the item. The point of sale system may then respond to the verification and/or may store the image/results as a record of the verification.

20 Claims, 6 Drawing Sheets

Related U.S. Application Data continuation of application No. 14/662,922, filed on Mar. 19, 2015, now Pat. No. 9,412,242.

(60) Provisional application No. 61/975,241, filed on Apr. 4, 2014.

(51) Int. Cl.
*G06Q 20/40* (2012.01)
*G07G 1/00* (2006.01)
*G06K 7/10* (2006.01)
*G06K 7/12* (2006.01)
*G06K 19/06* (2006.01)

(52) U.S. Cl.
CPC ........... *G06K 7/12* (2013.01); *G06K 19/0614* (2013.01); *G06Q 20/327* (2013.01); *G06Q 20/40* (2013.01); *G06Q 20/405* (2013.01); *G06Q 20/409* (2013.01); *G07G 1/0054* (2013.01)

(56) References Cited

U.S. PATENT DOCUMENTS

| | | | |
|---|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |

(56) References Cited

U.S. PATENT DOCUMENTS

| | | |
|---|---|---|
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 9,672,507 B2 | 6/2017 | Van Horn et al. |
| 2006/0191994 A1 | 8/2006 | Steiger |
| 2007/0063048 A1 | 3/2007 | Havens et al. |
| 2007/0138260 A1* | 6/2007 | Keys .................. G06Q 20/341 235/380 |
| 2009/0073503 A1 | 3/2009 | Lebaschi et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0221101 A1 | 8/2013 | Lebaschi et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |

(56) References Cited

U.S. PATENT DOCUMENTS

| | | |
|---|---|---|
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0353382 A1* | 12/2014 | Rambler ............ G06K 7/10821 235/462.13 |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |

(56) References Cited

U.S. PATENT DOCUMENTS

| | | |
|---|---|---|
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |

OTHER PUBLICATIONS

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 14 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch Fora Mobile Electronic Device filed Jun. 16, 2015 (Bamdringa); 38 pages.

U.S. Appl. No. 14/740,373 for Calibrating a Volume Dimensioner filed Jun. 16, 2015 (Ackley et al. );63 pages.

European Exam Reportfor related EP Application No. 15162458.2. dated Sep. 26, 2016, 4 pages.

Search Report and Written Opinion in counterpart European Application No. 15162458.2 dated Aug. 18, 2015, pp. 1-5.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

* cited by examiner

MULTIFUNCTION POINT OF SALE SYSTEM

CROSS-REFERENCE TO RELATED APPLICATION

The present application claims the benefit of U.S. patent application Ser. No. 15/228,273 for a Multifunction Point of Sale System filed Aug. 4, 2016 (and published Nov. 24, 2016 as U.S. Patent Publication No. 2016/0342970), now U.S. Pat. No. 9,672,507, which claims the benefit of U.S. patent application Ser. No. 14/662,922 for a Multifunction Point of Sale System filed Mar. 19, 2015 (and published Oct. 8, 2015 as U.S. Patent Publication No. 2015/0287290), now U.S. Pat. No. 9,412,242, which claims the benefit of U.S. Patent No. 61/975,241 for an Indicia Reader Having Authentication Capabilities filed Apr. 4, 2014. Each of the foregoing patent applications, patent publications, and patents is hereby incorporated by reference in its entirety.

FIELD OF THE INVENTION

The present invention relates to the field of point of sale systems and, more specifically, to a point of sale system with both indicia reading and verification capabilities.

BACKGROUND

Point of sale systems are used at checkout to tally items for payment, to process a payment, and to update a store's inventory. These systems have computing capabilities and often use multiple data-collection devices. These data-collection devices are typically added as peripherals to a host-computing device. Space to accommodate these data-collection devices may become an issue when too many devices are added to the checkout area. It is, therefore, desirable to combine the functionality of these devices whenever possible.

One data-collection device is the indicia reader (i.e., barcode scanner). Indicia readers are available in multiple varieties (e.g., scanning, imaging, etc.), and are commonly found at a retail store's point of sale (i.e., checkout). Well known among the varieties of indicia readers are fixed mount and handheld indicia readers. These indicia readers can conveniently scan a variety of indicia types (e.g., barcodes) to obtain product information for use during the checkout process.

Besides barcodes, other information is often required at checkout. During payment, for example, the signature on a credit card may be visually inspected to verify the card's ownership. Sometimes, items require a customer to present some additional information for legal or security reasons. For example, a customer purchasing alcohol may be required to present proof of age (e.g., a driver's license). In another example, a driver's license may be used to verify a credit card.

Unfortunately, sometimes the items presented at checkout may not be valid or authentic. Extra scrutiny and record keeping is increasingly required to prevent loss and/or liability. Failing to detect counterfeit or invalid items and/or create a record of verification could result in fines and/or loss.

Invisible security marks are often printed or affixed to an item for verification purposes. These insecurity marks may be detected and/or decoded by using some specialized process/device. For example, security marks printed using invisible ink may fluoresce visibly under special illumination.

Many of these verification processes take extra time and utilize special equipment. The special equipment may require extra space at checkout, which is not always available. The extra time required for checkout may annoy both the customer and the merchant. What is more, overt security processes may bother some customers and may tip-off violators.

Therefore, a need exists for an indicia reader that can read indicia (e.g., barcodes) and record, authenticate, validate, and/or verify items at checkout. The need further exists for this indicia reader to perform these security checks in a way that is convenient, that does not significantly slow processing time, and that is discreet.

SUMMARY

Accordingly, in one aspect, the present invention embraces a point-of-sale system. The point of sale system includes an illumination subsystem configured to illuminate an item with radiation from a light source in order to facilitate imaging. The point of sale system also includes an imaging subsystem configured to acquire images within a field of view illuminated by the illumination subsystem. An indicia reading subsystem is also included as part of the point of sale system and is configured to decode indicia information from the images acquired by the imaging subsystem. The point of sale further includes a verification subsystem that is configured to verify the item from images acquired by the imaging subsystem and to produce an output corresponding to the verification.

In an exemplary embodiment, the radiation from the point of sale system's illumination subsystem includes visible light radiated at a specific angle with respect to the item.

In another exemplary embodiment, the radiation from the point of sale system's illumination subsystem includes ultraviolet light.

In another exemplary embodiment, the radiation from the point of sale system's illumination subsystem includes infrared (IR) light.

In another exemplary embodiment, the point of sale system's imaging subsystem includes a sensor for detecting visible light.

In another exemplary embodiment, the point of sale system's imaging subsystem includes a sensor for detecting ultraviolet (UV) light.

In another exemplary embodiment, the point of sale system's imaging subsystem includes a sensor for detecting infrared (IR) light.

In another exemplary embodiment, the point of sale system's imaging subsystem includes a sensor configured to detect infrared (IR), visible (VIS), and ultraviolet (UV) light.

In another exemplary embodiment, the point-of-sale system's verification subsystem verifies the item by sensing a response to the illumination subsystem's radiation or by sensing that there has been no response to the illumination subsystem's radiation. In some exemplary embodiments, the response to the radiation includes the appearance of a security mark on the item. In an exemplary embodiment, this security mark may include ultraviolet fluorescent ink, while in another exemplary embodiment the security mark may include a hologram.

In another exemplary embodiment, the point of sale system includes a computer readable memory to store the output of the verification subsystem.

In another exemplary embodiment, the output of the point of sale system's verification system is an image, while in another exemplary embodiment the output is an alert to the user.

In another exemplary embodiment, point of sale's subsystems are embodied in a handheld scanner.

In another aspect, the present invention embraces a point of sale system capable of operating in either (i) an indicia-reading mode or (ii) a verification mode. The point of sale system includes an illumination subsystem, an imaging subsystem, an indicia-reading subsystem, and a verification subsystem. The illumination subsystem is configured to illuminate an item with radiation from a light source. The imaging subsystem is configured to acquire images within a field of view illuminated by the illumination subsystem. When the point of sale system is in the indicia-reading mode, the indicia-reading subsystem is configured to decode indicia information from the images acquired by the imaging subsystem. When the point of sale system is in the verification mode, the verification subsystem is configured to verify the item from images acquired by the imaging subsystem.

In an exemplary embodiment, the point of sale system's verification mode is activated by a user.

In another exemplary embodiment, the point of sale system's verification mode is activated when a particular indicium is decoded by the indicia-reading subsystem.

In another aspect, the present invention embraces a point of sale system capable of operating in either (i) an indicia-reading mode activated by default or (ii) a verification mode activated when an authentication criterion is met. The point of sale system includes an illumination subsystem, an imaging subsystem, an indicia-reading subsystem, and a verification subsystem. The illumination subsystem is configured to illuminate an item with radiation from a light source. The imaging subsystem is configured to acquire images within a field of view illuminated by the illumination subsystem. When the point of sale system is in the indicia-reading mode, the indicia-reading subsystem is configured to decode indicia information from the images acquired by the imaging subsystem. When the point of sale system is in the verification mode, the verification subsystem is configured to verify the item from images acquired by the imaging subsystem and to produce an output corresponding to the verification.

In an exemplary embodiment, the authentication criterion includes a transaction requiring a customer's credentials.

In another exemplary embodiment, the authentication criterion includes a transaction using currency above a certain denomination.

In another exemplary embodiment, the authentication criterion includes a transaction using a credit card or debit card.

In another exemplary embodiment, the authentication criterion includes a transaction using near field communication or a smartphone payment service.

The foregoing illustrative summary, as well as other exemplary objectives and/or advantages of the invention, and the manner in which the same are accomplished, are further explained within the following detailed description.

DETAILED DESCRIPTION

The present invention embraces a point of sale system that may operate as both an indicia reader (i.e., barcode scanner) or as a verifier of items at checkout.

Figure 1:
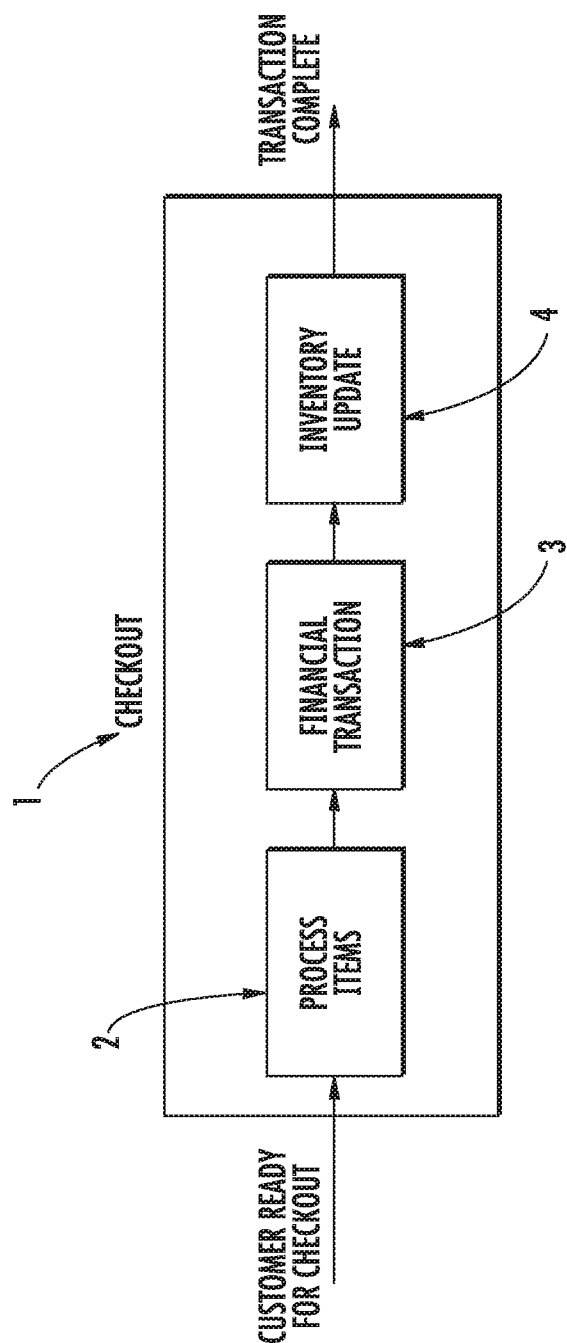
FIG. 1 is a flowchart depicting the checkout process according to an embodiment of the present invention.

As shown in FIG. 1 the checkout process 1 may include steps to (i) process items 2 (e.g., scan barcodes, weigh items, etc.) to compute an itemized total, (ii) accept payment (e.g., cash, credit, debit, payment using near field communication or a smartphone payment service, etc.) for the items (i.e., financial transaction 3), and (iii) update the store's inventory (i.e., inventory update 4) to reflect the absence of the sold items. In both the process items 2 step and the financial transaction 3 step, it is sometimes necessary to verify an item or items (e.g., a credit card, a currency note, a driver's license, etc.).

Figure 2:
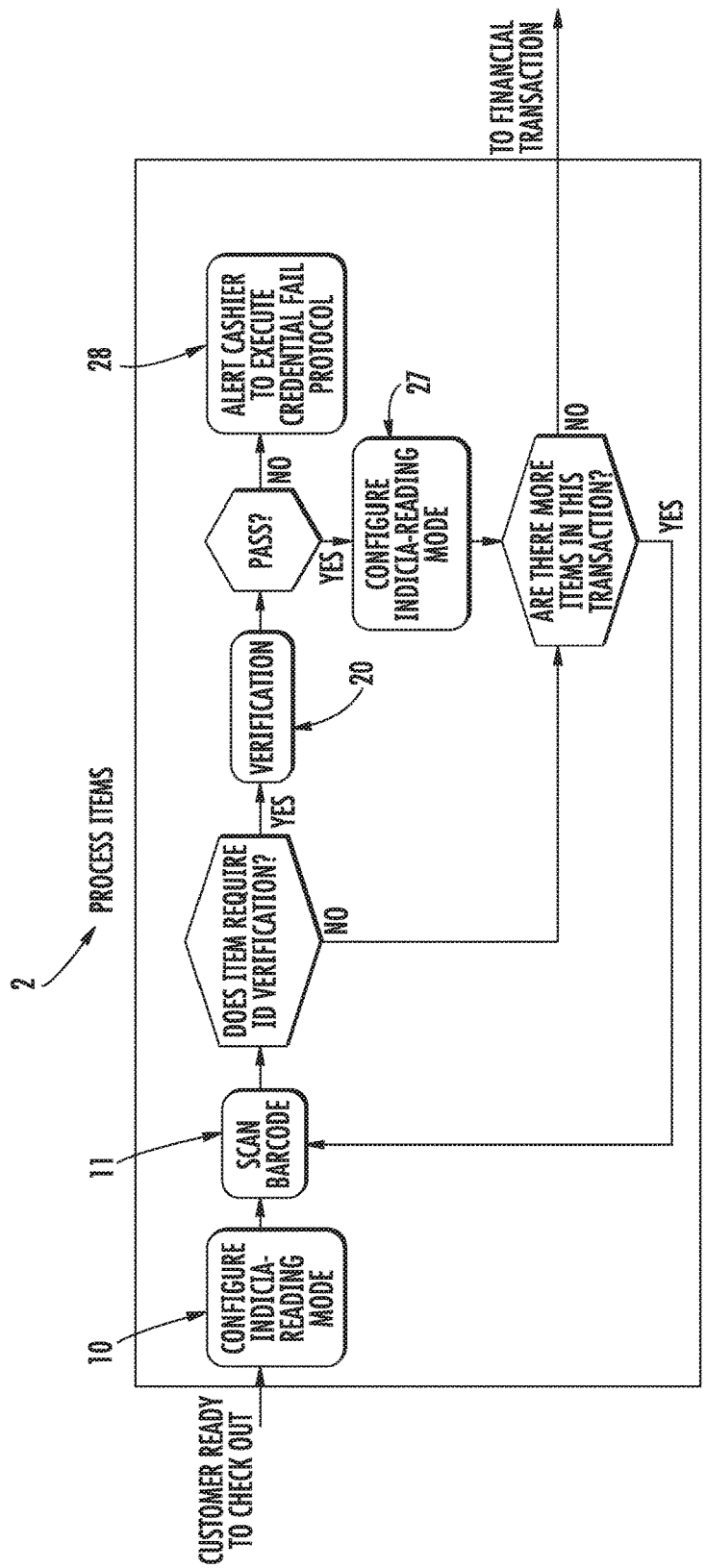
FIG. 2 is a flowchart further depicting the process-items process according to an embodiment of the present invention.

An exemplary method to process items 2 is shown in FIG. 2. A customer that is ready for checkout approaches the point of sale system (i.e., checkout) with items for purchase. The point of sale system typically operates an in indicia-reading mode 10 (i.e., barcode-scanning mode), meaning that the point of sale system's illumination, imaging, and processing have been configured to read indicia. The indicia-reading mode may be the default mode of the point of sale system but may also be activated or switched to from another mode either automatically (e.g., sensing items/customer) or manually (e.g., a cashier sign-on).

A user (e.g., cashier, store attendant, etc.) scans a barcode 11 to produce the barcoded information (e.g., item description, type, price, etc.). The point of sale system may then use this information for verification. For example, the point of sale system may compare the barcoded information to a look-up table stored in a computer readable memory or available via a network connection to determine if verification is necessary for the item. If the barcoded information indicates that the item does not need verification, the system remains in indicia-reading mode and more items may be scanned. If, however, the barcoded information indicates that verification is necessary (e.g., alcohol is purchased), then the point of sale system may start the verification process 20.

Verification 20 may be triggered for many different reasons. In one embodiment, a customer's credentials (e.g., driver's license) require verification prior to purchase. Here, the goal may be to determine the customer's age or to verify the customer is the owner of a credit or debit card. In another embodiment, a currency note (e.g., 100-dollar bill) may need to be authenticated. In still another embodiment, a credit/debit card may need to be authenticated. The verification settings (e.g., illumination, imaging, etc.) may change depending on the item to be verified (i.e., verification type).

The different verification settings may be stored in a computer readable memory. The library of different verification settings may be expanded and/or adapted as security marks are added or changed.

Figure 3:
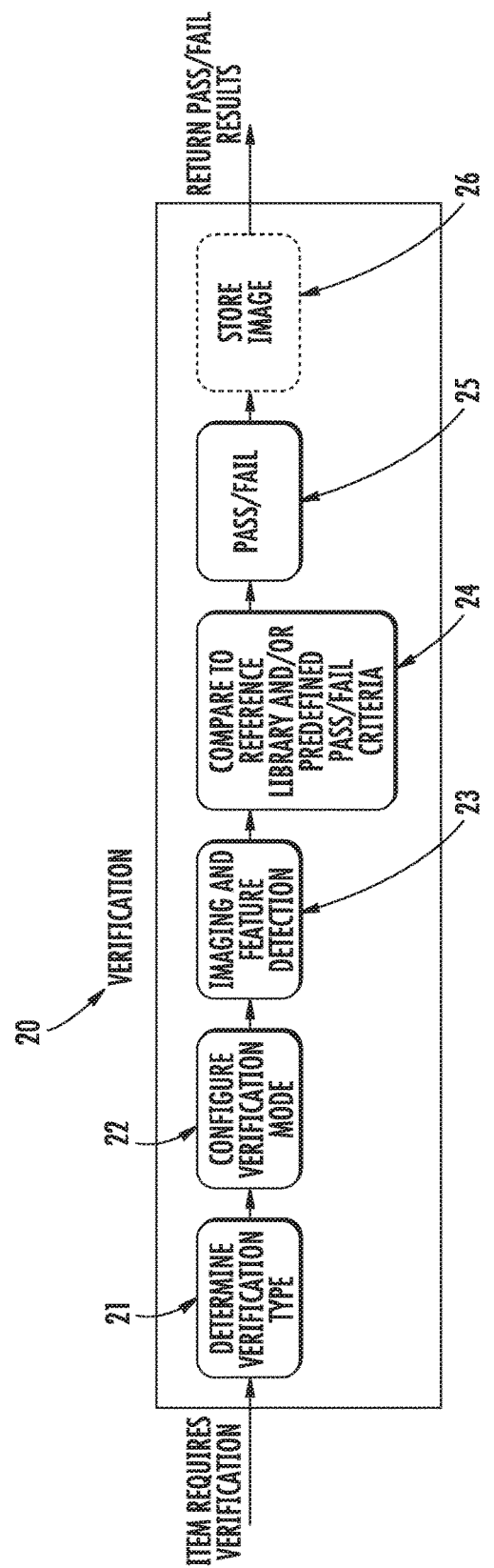
FIG. 3 is a flowchart further depicting the verification process according to an embodiment of the present invention.

An exemplary, verification process 20 is shown in FIG. 3. First, the verification type is determined 21 either automatically (e.g., from barcoded information) or manually (e.g., cashier input). The point of sale system then configures the illumination, imaging, and processing (e.g., algorithms, software, etc.) to facilitate verification of the item. In other words, the point of sale system is placed in verification mode 22.

At this point, the item for verification is illuminated and imaged by the point of sale system. In an exemplary embodiment, the customer places the item (e.g., a driver's license) on a customer-facing transparent plate to hold the item for illumination and imaging. The item is illuminated by a light source in an illumination subsystem. The light source is configured to illuminate the item for imaging and/or to illicit some response to the illumination. The response to the illumination may include the appearance (or lack of appearance) of a security mark on the item.

There are numerous types and styles of security marks. Security marks make items hard to counterfeit. Typically, security marks are invisible without special illumination (e.g., a particular wavelength, a particular angle, etc.). In one embodiment, a security mark may include ultraviolet fluorescent ink that is invisible unless it is illuminated with ultraviolet light. In another embodiment, a security mark may include a hologram that is best view with visible light from a certain angle or may change as the angle of illumination is changed. In still another embodiment, the security mark may include infrared absorbing or reflecting material.

After the item is illuminated and imaged, the image of the item is processed (e.g., feature detection algorithms running on a processor) for a security mark or marks (or lack of thereof) 23. The results of this examination are then compared to a reference library of pass/fail criteria 24 (e.g., size/shape of a security mark in a certain location) stored in a local computer readable memory or available via a network connection. A pass or fail is returned 25 at the conclusion of the verification. In some cases, the image acquired for verification may then be stored 26 in a computer readable memory integrated with the point of sale system or uploaded to a host computer in communication with the point of sale system via either a wired or a wireless network. The storage of the image may provide a merchant with a record of the verification. This record may be useful in a variety of ways. For example, the visual record could help prove a compliance to a standard or help with the prosecution/prevention of crime.

The verification process returns the pass or fail results and the processing of items continues as shown in FIG. 2. If the verification process returns a "pass," then the point of sale system is returned to indicia-reading mode 27 and more items are scanned if necessary. If the verification process returns a "fail," (i.e., not pass) then the cashier (or other appropriate personnel) may be alerted 28 (e.g., audible or visual alert). In one possible embodiment, the alert may be a message displayed on a screen to instruct the cashier how to respond. In some cases, this message includes instructions to execute a known protocol or standard operating procedure (SOP) devised by the merchant for these scenarios. The alerts for various verification scenarios may be stored on the point of sale system or on remote device either directly connected or connected via a wired and/or wireless network.

Figure 4:
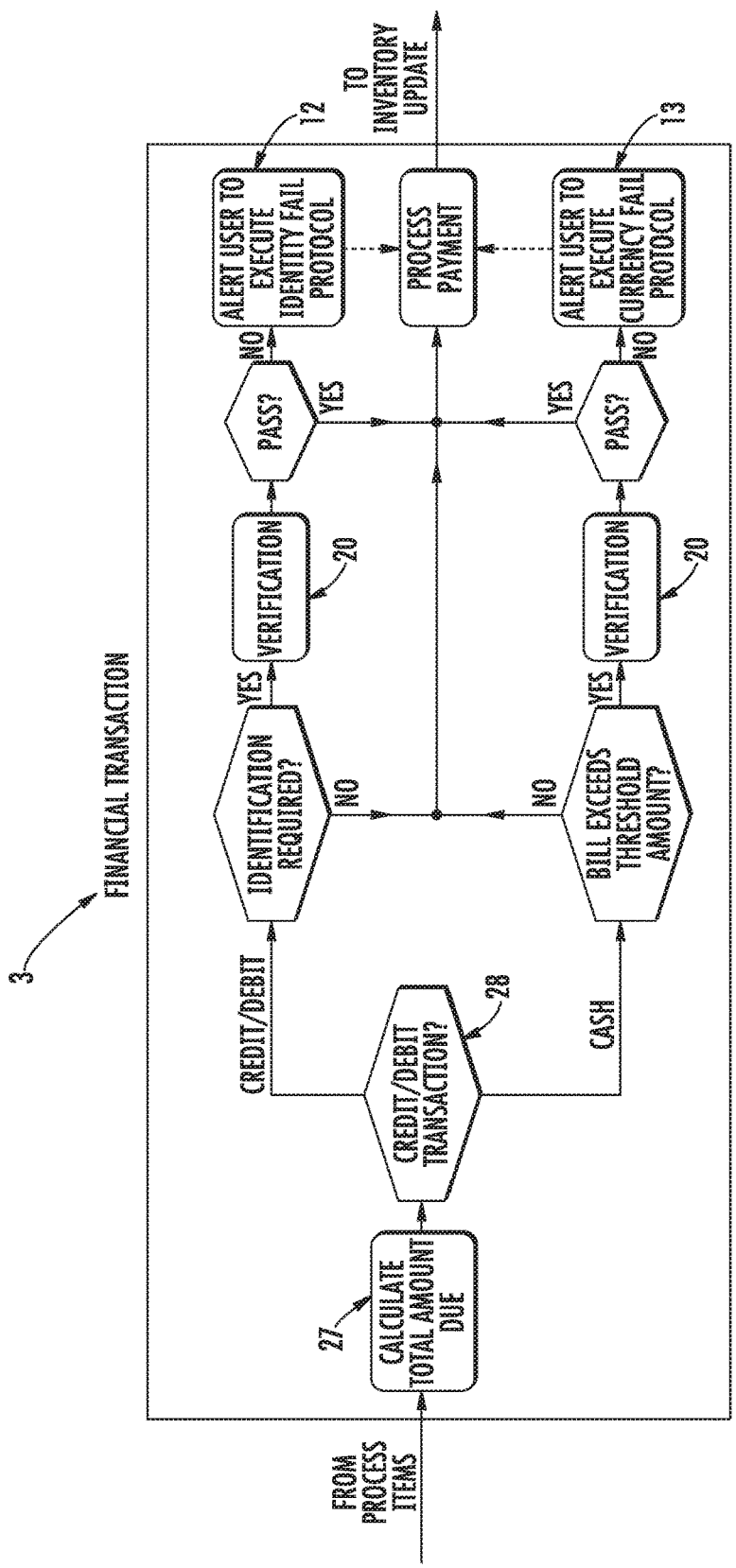
FIG. 4 is a flowchart further depicting the financial-transaction process according to an embodiment of the present invention.

As shown in FIG. 1, when the process items 2 step is complete, the checkout process 1 moves to the financial transaction 3. An exemplary financial transaction process is shown in FIG. 4. Here, two payment methods are illustrated (i.e., credit/debit and cash), however the present invention is not limited to these payment methods. Other payment methods (e.g., check, gift card, coupon, smartphone payment etc.) are within the scope of this invention, as each may require verification.

The financial transaction process 3 begins with the step of calculating the total amount due 27. Here, the customer may choose to pay with a credit/debit card or cash 28. In either case, verification 20 may be required. For example, a credit card may require a proof of ownership or may require proof of authenticity. Cash (e.g., a currency note) may be verified to prove that it is not counterfeit. In either case, the verification process 20 may be executed as shown in FIG. 3 and described previously but with initial conditions and settings suitable for each verification type. If a verification fails then the user receives an alert corresponding to the verification 12,13. If no verification was required or if the item passes verification, then the financial transaction process ends by processing the customer's payment. The checkout process 1 (shown in FIG. 1) then moves to the inventory update 4 step where the purchased items are subtracted from the store inventory to reflect the purchase and the transaction is complete.

Figure 5:
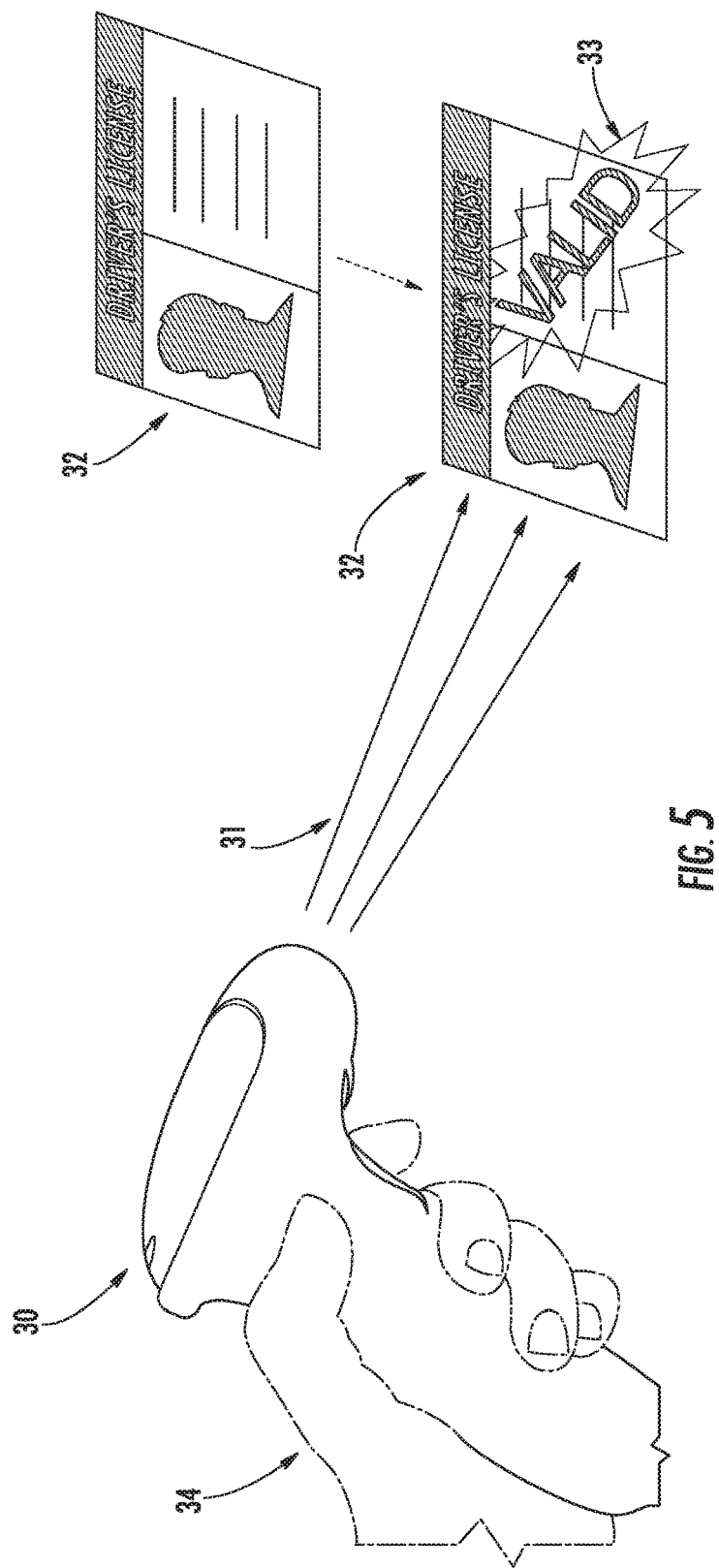
FIG. 5 graphically depicts a perspective view of a handheld scanner configured for verification according to an embodiment of the present invention.

An exemplary point of sale system performing verification according to an embodiment of the present invention is shown in FIG. 5. Here, the point of sale system and some (or all) of its subsystems are integrated within a handheld indicia reader 30. In some cases, only the illumination subsystem and imaging subsystem may be integrated within the handheld indicia reader 30. In these cases, the image/signal processing for barcode decoding and/or security mark verification may be performed by a host computing-device communicatively coupled to the handheld indicia reader.

When the verification mode is activated (e.g., by a user pressing the handheld indicia-reader's button), the handheld indicia-reader projects radiation 31 for verification. A user 34 holding the indicia reader 30 may direct the verification radiation 31 towards the item 32. Alternatively, if the indicia reader is in a fixed position (e.g., is resting in a fixed frame), the item 32 may be positioned in front of the radiation 31.

The item 32 for verification shown in FIG. 5 is a driver's license 32. A security mark 33 (e.g., "VALID") on the driver's license 32 becomes visible when the driver's license is positioned within the field of view of the radiation 31 (i.e., illumination).

The handheld indicia-reader's imaging subsystem is aligned with the illumination system. The imaging subsystem typically has a field of view with an area that is equal to or smaller than the illumination field of view, however in some cases it could be larger. The imaging subsystem captures an image of the driver's license while illuminated in order to capture the security mark's response (or lack of response) to the illumination. This image may be analyzed (i.e., processed) and compared to a reference database (i.e., library) to insure that the security mark is appropriate (e.g., present, in a certain position, of a certain shape/size, etc.).

Figure 6:
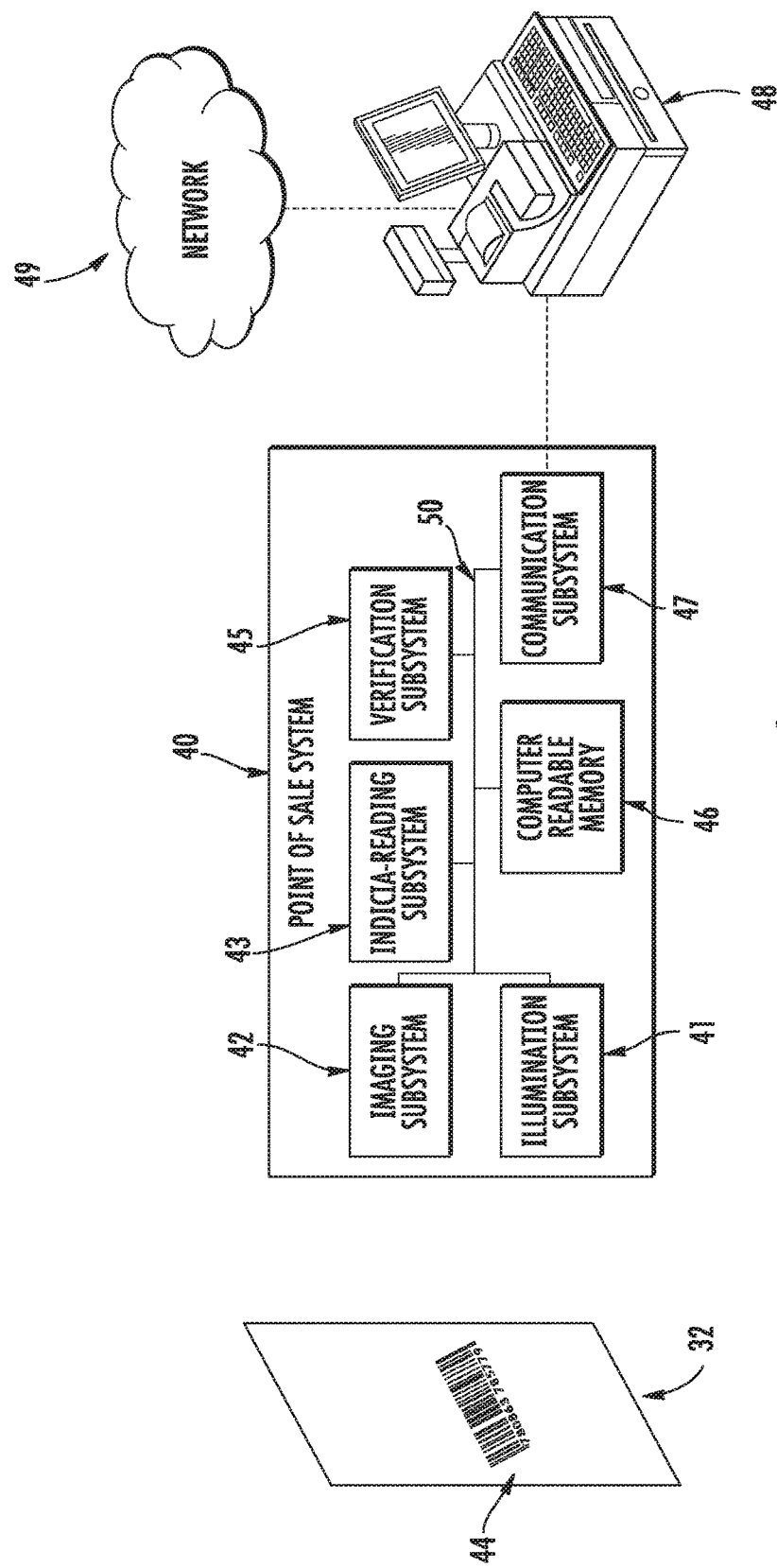
FIG. 6 schematically depicts a block diagram of a point of sale system in an exemplary operating environment according to an embodiment of the present invention.

A block diagram of an exemplary point of sale system 40 is shown in FIG. 6. The point of sale system may be part of a larger checkout system including, but not limited to, cash registers, credit-card readers, and/or computers. All of these devices may be communicatively coupled to exchange information. What is more, these devices may be communicatively coupled to a network (e.g., cloud computing network).

The point of sale system 40 is configured to operate in an indicia-reading mode or a verification mode and as such requires multiple subsystems to be integrated with or communicatively coupled to each other.

As shown in FIG. 6, the point of sale system includes an illumination subsystem 41. The illumination subsystem 41 may include one or more optical radiation (i.e., light) sources to generate illumination for either indicia reading or verification. A typical light source is a light emitting diode (LED); however, other light source types (e.g., lasers, filament, plasma, etc.) could be used as well. The illumination subsystem 41 may use a single light source for each mode of operation. Alternatively, the illumination subsystem 41 may include an array of light sources that are co-directed to improve output power and/or field of view.

The light source in the illumination subsystem 41 may be configured to radiate light in a narrow band of the ultraviolet spectral range (e.g., 300-400 nanometers), the visible spectral range (e.g., 400-750 nanometers), or the infrared spectral range (e.g., the near-infrared range of 750-1100 nanometers). For example, a typical wavelength for visualizing an ultraviolet fluorescent security mark (i.e., watermark) is 365 nanometers. The present invention may also use broadband light sources covering multiple spectral ranges. For example, a white light source and an ultraviolet source could be used to simultaneously illuminate the item and cause a security mark response.

The illumination subsystem 41 may also include filtering (e.g., chromatic, polarization, etc.) to impart the radiation necessary to cause a security mark response (e.g., reflection, emission, or absorption). For example, a switchable filter bank and a broadband source may provide a means to change illumination wavelength to illicit a response from different security features.

The illumination subsystem 41 may also include beam shaping optics (e.g., lens, grating, fiber bundle, etc.) to direct and form the illumination pattern to a field of view. For example, lenses may be used to collimate the light rays to form a homogeneous illumination over the field of view.

As shown in FIG. 6, the point of sale system includes an imaging subsystem 42. The imaging subsystem 42 is designed to capture a digital image of a field of view aligned with the illumination subsystem. To achieve this imaging, the imaging subsystem 42 may include an imaging lens or lenses to form a real image onto a sensor array. Optical filters may also be included to help remove stray light and/or enhance the visibility of a security mark. The sensor may be a color or monochromatic sensor. The sensor may use charge coupled device (CCD) or complementary metal oxide semiconductor (CMOS) technology. For example, a sensor used for indicia reading may be a silicon CCD array, which is sensitive to visible wavelengths.

An indicia-reading subsystem 43 is also part of the point of sale system shown in FIG. 6. The indicia-reading subsystem 48 includes the necessary signal conditioning electronics (e.g., filtering, amplification, etc.) and a processor (e.g., one or more controllers, digital signal processor (DSP), image signal processor, application specific integrated circuit (ASIC), programmable gate array (PGA), and/or programmable logic controller (PLC)) to detect and decode indicia (e.g., one-dimensional (1D) barcodes, two-dimensional (2D) barcodes, color barcodes, etc.). Typically, the indicia-reading subsystem 43 will recognize and decode a universal product code (i.e., UPC) 44 affixed to or printed on an item 32.

The point of sale system 40, shown in FIG. 6, also includes a verification system 45. The verification subsystem 45 includes the necessary signal conditioning electronics (e.g., filtering, amplification, etc.) and a processor (e.g., one or more controllers, digital signal processor (DSP), image signal processor, application specific integrated circuit (ASIC), programmable gate array (PGA), and/or programmable logic controller (PLC)) to detect and verify (e.g., match to a known security mark in a reference library) a security mark. In one possible embodiment of the present invention, the same processor is used for indicia reading and verification. Here, the difference between the subsystems lies in the software (i.e., algorithms) running on the processor.

The point of sale system 40 also includes a computer readable memory 46 (e.g., read only memory (ROM), flash memory, and/or a hard-drive) to store the necessary software, reference libraries, and results for indicia reading and verification.

As shown in FIG. 6, the point of sale system 40 may also include a communication subsystem 47 for transmitting and receiving information to/from a host computing-device 48 and/or storage device. The host computing-device 48 may also be connected to a network 49, thereby allowing the device to transmit or receive data to/from remote locations. The communication subsystem 47 may facilitate a wired or wireless data link using a variety of possible protocols (e.g., IEEE 802.11, including WI-FI®, BLUETOOTH®, CDMA, TDMA, GSM, etc.).

The subsystems in the point of sale system shown in FIG. 6 are electrically connected via a couplers (e.g., wires, conducting traces, etc.), buses, and control lines to form an interconnection subsystem 50. The interconnection system 50 facilitates the operation of the subsystems and interaction there between.

\* \* \*

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,526; 8,798,367; 8,807,431; 8,807,432; 8,820,630;

International Publication No. 2013/163789;
International Publication No. 2013/173985;

International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);

U.S. patent application Ser. No. 13/771,508 for an Optical Redirection Adapter, filed Feb. 20, 2013 (Anderson);

U.S. patent application Ser. No. 13/852,097 for a System and Method for Capturing and Preserving Vehicle Event Data, filed Mar. 28, 2013 (Barker et al.);

U.S. patent application Ser. No. 13/902,110 for a System and Method for Display of Information Using a Vehicle-Mount Computer, filed May 24, 2013 (Hollifield);

U.S. patent application Ser. No. 13/902,144, for a System and Method for Display of Information Using a Vehicle-Mount Computer, filed May 24, 2013 (Chamberlin);

U.S. patent application Ser. No. 13/902,242 for a System For Providing A Continuous Communication Link With A Symbol Reading Device, filed May 24, 2013 (Smith et al.);

U.S. patent application Ser. No. 13/912,262 for a Method of Error Correction for 3D Imaging Device, filed Jun. 7, 2013 (Jovanovski et al.);

U.S. patent application Ser. No. 13/912,702 for a System and Method for Reading Code Symbols at Long Range Using Source Power Control, filed Jun. 7, 2013 (Xian et al.);

U.S. patent application Ser. No. 29/458,405 for an Electronic Device, filed Jun. 19, 2013 (Fitch et al.);

U.S. patent application Ser. No. 13/922,339 for a System and Method for Reading Code Symbols Using a Variable Field of View, filed Jun. 20, 2013 (Xian et al.);

U.S. patent application Ser. No. 13/927,398 for a Code Symbol Reading System Having Adaptive Autofocus, filed Jun. 26, 2013 (Todeschini);

U.S. patent application Ser. No. 13/930,913 for a Mobile Device Having an Improved User Interface for Reading Code Symbols, filed Jun. 28, 2013 (Gelay et al.);

U.S. patent application Ser. No. 29/459,620 for an Electronic Device Enclosure, filed Jul. 2, 2013 (London et al.);

U.S. patent application Ser. No. 29/459,681 for an Electronic Device Enclosure, filed Jul. 2, 2013 (Chaney et al.);

U.S. patent application Ser. No. 13/933,415 for an Electronic Device Case, filed Jul. 2, 2013 (London et al.);

U.S. patent application Ser. No. 29/459,785 for a Scanner and Charging Base, filed Jul. 3, 2013 (Fitch et al.);

U.S. patent application Ser. No. 29/459,823 for a Scanner, filed Jul. 3, 2013 (Zhou et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 29/468,118 for an Electronic Device Case, filed Sep. 26, 2013 (Oberpriller et al.);

U.S. patent application Ser. No. 14/055,234 for Dimensioning System, filed Oct. 16, 2013 (Fletcher);

U.S. patent application Ser. No. 14/053,314 for Indicia Reader, filed Oct. 14, 2013 (Huck);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/087,190 for Optimal Range Indicators for Bar Code Validation, filed Nov. 22, 2013 (Hejl);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/150,393 for Indicia-reader Having Unitary Construction Scanner, filed Jan. 8, 2014 (Colavito et al.);

U.S. patent application Ser. No. 14/154,207 for Laser Barcode Scanner, filed Jan. 14, 2014 (Hou et al.);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILEPHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEBBASED SCAN-TASK ENABLED SYSTEM AND METHOD OF AND APPARATUS FOR DEVELOPING AND DEPLOYING THE SAME ON A CLIENTSERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an INCOUNTER BARCODE SCANNER, filed Jun. 24, 2014 (Oberpriller et al.).

\* \* \*

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of operating a point of sale system, the method comprising:
   capturing, with an imaging subsystem, an image of an indicia in an indicia reading mode;
   decoding, with an indicia-reading subsystem, the indicia in the captured image;
   changing the indicia reading mode to a verification mode in response to the decoded indicia;
   capturing, with the imaging subsystem, an image of an item to be verified in the verification mode, wherein the item to be verified includes a security mark that is invisible, and the image of the item to be verified is captured in a predetermined manner so that the security mark is visible in the captured image of the item to be verified;
   verifying the item to be verified based on the presence or absence of the security mark in the captured image of the item to be verified;
   restricting a checkout process in response to the verification.

2. The method of claim 1, comprising illuminating the item with radiation.

3. The method of claim 2, wherein the radiation comprises ultraviolet light, and/or infrared light.

4. The method of claim 1, comprising outputting an audible and/or visual alert in response to the verification.

5. The method of claim 1, wherein the item to be verified comprises currency.

6. The method of claim 1, wherein the item to be verified comprises at least one of a credit card and a driver's license.

7. A method of operating a point of sale system, the method comprising:
- capturing, with an imaging subsystem, an image of an indicia in an indicia reading mode;
- decoding, with an indicia-reading subsystem, the indicia in the captured image;
- changing the indicia reading mode to a verification mode in response to the decoded indicia;
- in the verification mode:
  - illuminating an item with radiation;
  - capturing, with the imaging subsystem, an image of an item, comprising sensing radiation reflected from the item, wherein the item includes a security mark that is invisible, and the illuminating and the capturing of the image of the item are carried out so that the security mark is visible in the captured image of the item; and
  - verifying the item based on the presence or absence of the security mark in the captured image of the item;
- restricting a checkout process in response to the verification.

8. The method of claim 7, wherein the radiation comprises ultraviolet light, and/or infrared light.

9. The method of claim 7, comprising outputting an audible and/or visual alert in response to the verification.

10. The method of claim 7, comprising illuminating the item with visible light while in indicia reading mode.

11. The method of claim 7, comprising generating a signal for changing the indicia reading mode to the verification mode in response to information in the decoded indicia.

12. The method of claim 11, comprising generating the signal for changing the indicia reading mode to the verification mode in response to information in the decoded indicia corresponding to a verification requirement.

13. A system operable in an indicia reading mode and a verification mode, the system comprising:
- an imaging subsystem configured to
  - acquire an image of an indicia in the indicia reading mode, and
  - acquire an image of an item to be verified in the verification mode, wherein the item to be verified includes a security mark that is invisible, and the image of the item to be verified is captured in a predetermined manner so that the security mark is visible in the captured image of the item to be verified;
- an indicia-reading subsystem configured to decode the indicia in the image of the indicia acquired by the imaging subsystem;
- the system being configured to change from the indicia reading mode to the verification mode in response to the decoded indicia;
- a verification subsystem configured to:
  - verify the item to be verified based upon the presence or absence of the securing mark being visible in the captured image of the item to be verified, and
  - produce an output corresponding to the verification, so that the output is configured to restrict the checkout process in case of failed verification.

14. The system of claim 13, comprising a memory for storing a library of verification settings.

15. The system of claim 14, wherein the system is configured to switch from indicia reading mode to verification mode based on verification settings or an authentication criterion being met.

16. The system of claim 15, wherein the authentication criterion comprises a transaction requiring a customer's credentials, a transaction using a currency above a certain denomination, a transaction using a credit card or debit card, and/or a transaction using near field communication or a smartphone payment service.

17. The system of claim 13, wherein the system is configured to switch from indicia reading mode to verification mode based on an authentication criterion being met.

18. The system of claim 17, wherein the authentication criterion comprises a transaction requiring a customer's credentials, a transaction using a currency above a certain denomination, a transaction using a credit card or debit card, and/or a transaction using near field communication or a smartphone payment service.

19. The system of claim 13, wherein the system illuminates items with radiation in the verification mode.

20. The system of claim 19, wherein the radiation comprises ultraviolet light, and/or infrared light.

* * * * *